C. TROJOVSKY.
AIR GOVERNOR.
APPLICATION FILED NOV. 19, 1913.

1,129,763.

Patented Feb. 23, 1915.

Witnesses

Inventor
C. Trojovsky
By
Attorney

UNITED STATES PATENT OFFICE.

CHARLES TROJOVSKY, OF NORWAY, IOWA.

AIR-GOVERNOR.

1,129,763.

Specification of Letters Patent.   Patented Feb. 23, 1915.

Application filed November 19, 1913.   Serial No. 801,960.

*To all whom it may concern:*

Be it known that I, CHARLES TROJOVSKY, a citizen of the United States, residing at Norway, in the county of Benton and State of Iowa, have invented certain new and useful Improvements in Air-Governors; and I do hereby declare the following to be a full, clear, and exact description of the invention, such as will enable others skilled in the art to which it appertains to make and use the same.

This invention relates to air governors, designed to be connected to the main valve of a compressed air reservoir to serve as a safety valve for relieving the reservoir of undue pressure, and one of the principal objects of the invention is to provide simple and efficient means to regulate the air pressure and to be set at any required predetermined position to operate for relieving the reservoir of undue air pressure and to close the outlet valve of the reservoir after a predetermined pressure has been attained.

Another object of the invention is to provide a spring regulated air valve to be connected to the main valve of an air reservoir, means being provided for adjusting the stress or tension of the spring to any predetermined degree of pressure, and to provide means for indicating the pressure at which the valve may be set for operation.

Figure 1:
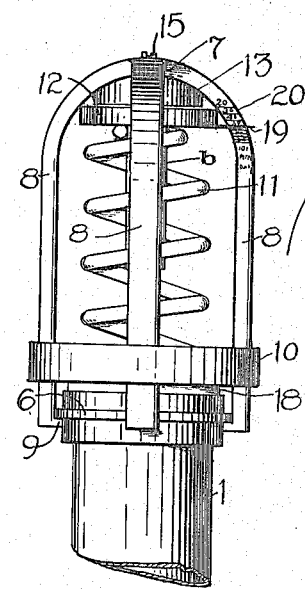
Figure 4:
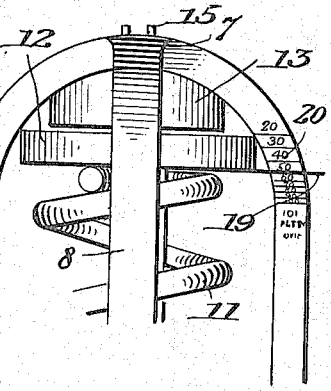
Figure 2:
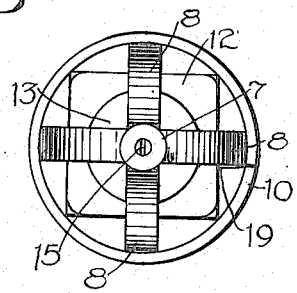
Figure 3:
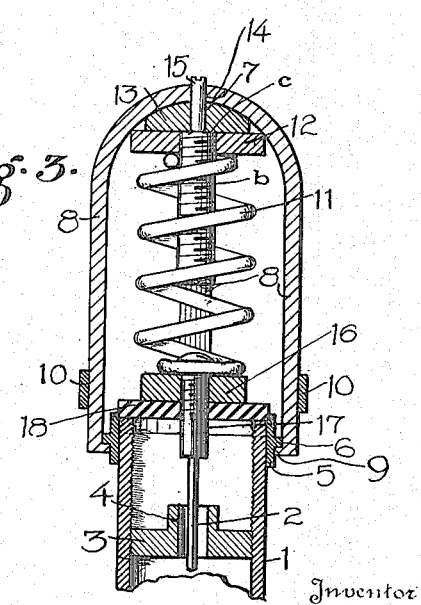

These and other objects may be attained by means of the construction illustrated in the accompanying drawings, in which, Figure 1 is a side elevation of an air governor made in accordance with this invention, Fig. 2 is a top plan view of the same, and Fig. 3 is a vertical sectional view of the same. Fig. 4 is an enlarged detail of the dome and registering mechanism of the air governor.

Referring to the drawings the numeral 1 designates the main air valve connected to the reservoir, not shown, and 2 is the main valve stem extending through a threaded collar 3, and through an enlarged opening 4, in said collar.

Connected to the upper end of the valve casing 1 is a ring or collar 5 provided with an outwardly projecting annular flange 6. An open dome 7 comprising a plurality of arms or members 8, is connected to the collar 5, by means of inturned lugs 9 which extend underneath the flange 6 of said collar. Surrounding the arms 8 is a ring 10, said ring being disposed near the lower ends of said arms, and the purpose being to hold the lugs 9 in position underneath the flange 6.

A spiral spring 11 is mounted between the arms 8 of the dome, said spring bearing at its upper end against a rectangular nut 12, said nut at its upper surface bearing against a curved washer 13, having a central perforation 14, through which an adjusting screw 15 extends, said screw consisting of the threaded portion $b$ engaged by the nut 12, the shoulder $c$, and the plain unthreaded shank 15, which extends through the curved washer 13 and is provided with a grooved head to be operated by a screw-driver for adjusting the tension of the spring 11. The lower end of the spring 11 bears against a nut 16, through which a screw bolt 17 extends, and mounted on said screw bolt 17 underneath the nut 16 is a rubber gasket 18, designed to bear against the upper edge of the main air valve casing 1.

Extending outward from the rectangular nut 12 is a pointer 19, designed to coöperate with a series of scale marks 20 on one of the arms 8, to indicate the pressure at which the spring 11 may be set. The tension of the spring 11 is adjusted by means of the adjusting screw 15, which when turned will move the nut 12 to slightly compress the spring when the pointer 19 will move relatively to the scale 20, to indicate the required pressure at which the main valve of the air reservoir will be relieved.

As shown in Fig. 3 the lower end of the screw bolt 17 bears against the stem 2 of the main air valve and normally holds the valve open so that the air will pass through the opening 4 into the upper end of the casing 1. When the air pressure has reached a point beyond the predetermined safety pressure the gasket 18 will be forced upward to permit the air to escape from the upper end of the collar 5 and out between the arms 8. Immediately after the pressure has been reduced in the reservoir sufficiently, the spring 11 will force the gasket 18 down in place to stop the outward flow of air.

From the foregoing it will be obvious that my invention is of simple construction and can be attached to any ordinary compressed air valve and is reliable and efficient in use.

What is claimed is:—

1. An air governor comprising a dome, having a series of depending arms, said arms having inwardly turned lugs to engage a flange on the outlet air valve of a compressed air reservoir, a ring surrounding the arms for holding the lugs connected to said flange, a spiral spring in said dome and having a valve structure associated with its lower end for controlling the outlet of the compressed air reservoir, a screw, a threaded nut thereon, said spring bearing at its upper end against said nut and said screw having a reduced extension projecting through said dome and provided with a groove to receive a screw-driver for adjusting the tension of said spring.

2. In a device of the character described, the combination of a dome comprising depending arms spaced apart, means for securing said arms to the outlet of a compressed air valve, a spring in the said dome and having a valve structure associated with its lower end for controlling the egress opening of the compressed air reservoir, a threaded screw, a nut mounted on said screw against which the upper end of said spring bears, said nut carrying a pointer, and one of said arms having indicating marks thereon, said screw having a reduced portion, a curved washer through which said reduced portion extends, said reduced portion projecting through the top of the dome and provided with means for turning the same to rotate the screw and adjust the tension of said spring.

3. In a device of the character described the combination of a dome comprising depending arms spaced apart, means for securing said arms to the outlet of a compressed air valve, a spring in said dome and having a valve structure associated with its lower end for controlling the egress opening of the compressed air reservoir of said valve, means for adjusting the tension of said spring, comprising a nut carrying a pointer, one of said arms having indicating marks thereon to coöperate with said pointer.

In testimony whereof I affix my signature in presence of two witnesses.

CHARLES TROJOVSKY.

Witnesses:
J. C. MESKIMER,
W. L. NORLAND.